United States Patent
Kim

(10) Patent No.: US 11,052,846 B2
(45) Date of Patent: Jul. 6, 2021

(54) VEHICLE BUMPER

(71) Applicant: TOYOTA SHATAI KABUSHIKI KAISHA, Kariya (JP)

(72) Inventor: Myoungjun Kim, Kariya (JP)

(73) Assignee: TOYOTA SHATAI KABUSHIKI KAISHA, Kariya (JP)

( * ) Notice: Subject to any disclaimer, the term of this patent is extended or adjusted under 35 U.S.C. 154(b) by 77 days.

(21) Appl. No.: 16/626,851

(22) PCT Filed: Jul. 13, 2018

(86) PCT No.: PCT/JP2018/026494
§ 371 (c)(1),
(2) Date: Dec. 26, 2019

(87) PCT Pub. No.: WO2019/039133
PCT Pub. Date: Feb. 28, 2019

(65) Prior Publication Data
US 2020/0223384 A1 Jul. 16, 2020

(30) Foreign Application Priority Data

Aug. 21, 2017 (JP) .............................. JP2017-158487

(51) Int. Cl.
*B60J 7/00* (2006.01)
*B60R 19/18* (2006.01)
*B60R 19/48* (2006.01)

(52) U.S. Cl.
CPC ............ *B60R 19/18* (2013.01); *B60R 19/483* (2013.01); *B60R 2019/186* (2013.01)

(58) Field of Classification Search
CPC . B60R 19/18; B60R 2019/1866; B60R 19/34; B60R 2019/1813;
(Continued)

(56) References Cited

U.S. PATENT DOCUMENTS 3,926,462 A * 12/1975 Burns ...................... B60R 19/18
293/136
4,427,225 A * 1/1984 Bauer ...................... B60R 19/26
293/132
(Continued)

FOREIGN PATENT DOCUMENTS

JP 2015-131508 A 7/2015
JP 2016-022940 A 2/2016
(Continued)

*Primary Examiner* — Kiran B Patel
(74) *Attorney, Agent, or Firm* — Christensen, Fonder, Dardi & Herbert PLLC

(57) ABSTRACT

A vehicle bumper may include a bumper absorber having a tube receiving groove that extends in a vehicle width direction, and an elastically deformable airtight pressure tube received in the tube receiving groove formed on the bumper absorber and in communication with a pressure sensor. The bumper absorber includes a beam-shaped absorber body portion extending in the vehicle width direction, and an elongated projecting portion extending in the vehicle width direction at a front end periphery of an upper surface of the absorber body portion. The tube receiving groove is configured to extend in the vehicle width direction on the upper surface of the absorber body portion while penetrating into a rear end portion of the elongated projecting portion, and is configured to open backward.

12 Claims, 9 Drawing Sheets

(58) Field of Classification Search
CPC .... B60R 2019/1806; B60G 2204/4502; B60G 2204/128; F16F 9/58
See application file for complete search history.

(56) References Cited

U.S. PATENT DOCUMENTS

| | | | | |
|---|---|---|---|---|
| 4,474,395 A * | 10/1984 | Harloff | ................ | B60R 19/18 293/120 |
| 5,201,912 A * | 4/1993 | Terada | ................ | B60R 19/18 293/120 |
| 5,393,111 A * | 2/1995 | Eipper | ................ | B60R 19/22 293/109 |
| 6,817,638 B1 * | 11/2004 | Choi | ................ | B60R 19/18 293/109 |
| 9,834,164 B1 * | 12/2017 | Iyer | ................ | B60R 21/38 |
| 2006/0091299 A1 * | 5/2006 | Inamoto | ............ | B60R 21/0136 250/221 |
| 2006/0131899 A1 * | 6/2006 | Adachi | ................ | B60R 19/18 293/109 |
| 2007/0114803 A1 * | 5/2007 | Takahashi | ............ | B60R 19/483 293/102 |
| 2007/0164574 A1 * | 7/2007 | Tanabe | ................ | B60R 19/483 293/102 |
| 2009/0019940 A1 * | 1/2009 | Suzuki | ................ | B60R 19/483 73/800 |
| 2009/0021359 A1 * | 1/2009 | Tanabe | ................ | B60R 19/483 340/436 |
| 2009/0024323 A1 * | 1/2009 | Tanabe | ................ | B60R 21/0136 701/301 |
| 2009/0322107 A1 * | 12/2009 | Takahashi | ............ | B60R 21/0136 293/121 |
| 2010/0038922 A1 * | 2/2010 | Takahashi | ............ | B60R 19/483 293/117 |
| 2011/0232396 A1 * | 9/2011 | Takahashi | ............ | B60R 19/483 73/862.581 |
| 2015/0115632 A1 * | 4/2015 | Iino | ................ | B60R 19/18 293/120 |
| 2016/0039376 A1 | 2/2016 | Narita | | |
| 2016/0039379 A1 * | 2/2016 | Saitoh | ................ | B60R 19/483 293/117 |
| 2016/0280166 A1 * | 9/2016 | Ikarugi | ................ | B60R 19/18 |
| 2016/0347270 A1 * | 12/2016 | Higashimachi | ......... | B60R 19/48 |
| 2017/0043735 A1 * | 2/2017 | Yamaguchi | ............ | B60R 19/483 |
| 2018/0208138 A1 * | 7/2018 | Wakabayashi | ............ | G01L 5/00 |
| 2018/0215336 A1 * | 8/2018 | Wakabayashi | .......... | B60R 21/34 |
| 2020/0139910 A1 * | 5/2020 | Maeda | ................ | B60R 19/03 |
| 2021/0094495 A1 * | 4/2021 | Park | ................ | B60R 19/18 |

FOREIGN PATENT DOCUMENTS

| | | |
|---|---|---|
| JP | 2016-37206 A | 3/2016 |
| JP | 2017-100563 A | 6/2017 |
| JP | 2017-100643 A | 6/2017 |

* cited by examiner

VEHICLE BUMPER

The present application is a 35 U.S.C. § 371 National Phase entry of, and claims priority to, PCT Application No. PCT/JP2018/026494, filed Jul. 13, 2018, which in turn claims priority to Japanese Patent Application No. 2017-158487, filed Aug. 21, 2017, both of which are hereby incorporated herein by reference in their entireties for all purposes.

BACKGROUND

The present disclosure relates to a vehicle bumper in which an elastically deformable airtight pressure tube, which communicates with a pressure sensor, is received in a tube receiving groove formed on a bumper absorber and extending in a vehicle width direction.

A conventional art relating to a vehicle bumper is described in JP2016-37206A. As shown in FIG. 17, the vehicle bumper 100 described in JP2016-37206A has a beam-shaped bumper reinforcement member 102 connected to a vehicle body, and a cushioning material of a bumper absorber 104 positioned in front of the bumper reinforcement member 102. The bumper absorber 104 has a tube receiving groove 104m extending in a vehicle width direction. The tube receiving groove 104m is formed on an upper portion of a rear end surface 104b of the bumper absorber 104, which surface is configured to contact an upper portion of a front surface of the bumper reinforcement member 102. Further, an elastically deformable airtight pressure tube 105, which communicates with a pressure sensor, is received in the tube receiving groove 104m of the bumper absorber 104.

According to the structure described above, when a collision load F is applied to the vehicle bumper 100, the bumper absorber 104 may be compressed in front of the bumper reinforcement member 102, so that the collision load F is absorbed to some degree. Further, the airtight pressure tube 105 is compressed between the bumper absorber 104 and the bumper reinforcement member 102. A pressure increase within the pressure tube 105 is detected by the pressure sensor. Thus, the application of the collision load F to the vehicle bumper 100 is detected, so that a pop-up hood system or other such system is activated in order to protect a pedestrian.

For example, when a pedestrian collides with the vehicle bumper 100, the legs of the pedestrian may contact the vehicle bumper 100, whereas the upper body of the pedestrian may fall against a hood. Therefore, the collision load F may be obliquely applied to the vehicle bumper 100 from before and above. Conversely, when a small animal or other such object collides with the vehicle bumper 100, the collision load F may be substantially horizontally applied to the vehicle bumper.

As described above, in the vehicle bumper 100, the pressure tube 105 is received in the tube receiving groove 104m formed in the rear end surface 104b of the bumper absorber 104, which surface is configured to contact the upper portion of the front surface of the bumper reinforcement member 102. Therefore, the pressure tube 105 may be compressed regardless of whether the collision load F is obliquely applied to the vehicle bumper 100 from before and above as due to a collision with the pedestrian or whether the collision load F is horizontally applied to the vehicle bumper 100 as due to a collision with the small animal or other such object. This may lead to an increased level of difficulty for determining whether the pedestrian collides with the vehicle bumper 100 or whether the small animal or other such object collides with the vehicle bumper 100.

Thus, there is a need in the art to provide an improved vehicle bumper.

SUMMARY

In a first aspect of the present disclosure, a vehicle bumper may include a bumper reinforcement member connected to a vehicle body, a bumper absorber functioning as a cushioning member that covers the bumper reinforcement member and having a tube receiving groove that extends in a vehicle width direction, an elastically deformable pressure tube received in the tube receiving groove formed on the bumper absorber and in communication with a pressure sensor, and a bumper cover covering the bumper absorber and the bumper reinforcement member. The bumper absorber includes a beam-shaped absorber body portion extending in the vehicle width direction and an elongated projecting portion defining an upper portion of a load receiving surface of the absorber body portion and extending in the vehicle width direction at an end periphery of an upper surface of the absorber body portion. The tube receiving groove is configured to extend in the vehicle width direction on the upper surface of the absorber body portion while penetrating into an end portion of the elongated projecting portion that is positioned opposite to the load receiving surface, and is configured to open in a direction away from the load receiving surface.

According to this aspect, the tube receiving groove, in which the pressure tube is received, is configured to extend in the vehicle width direction on the upper surface of the absorber body portion while penetrating into the end portion of the elongated projecting portion that is positioned opposite to the load receiving surface, and is configured to open in the direction away from the load receiving surface. Therefore, when a collision load is obliquely applied to the vehicle bumper from before and above, due to a collision of a pedestrian against the vehicle bumper, the elongated projecting portion of the bumper absorber may be compressed while being bent backward and downward about the tube receiving groove serving as a base point, so that the pressure tube received in the tube receiving groove may be compressed. Conversely, when the collision load is horizontally applied to the vehicle bumper, due to a collision of a small animal or other such object against the vehicle bumper, the absorber body portion of the bumper absorber may be horizontally compressed. At this time, the elongated projecting portion may substantially be prevented from being deformed, so that the tube receiving groove may be maintained in a condition in which it opens backward. Therefore, the tube sensor may substantially be prevented from being compressed. Thus, when the pedestrian collides with the vehicle bumper, the pressure tube may be easily compressed, whereas when the small animal or other such object collides with the vehicle bumper, the pressure tube may be prevented from being easily compressed. This may lead to an increased degree of accuracy of determining whether the pedestrian collides with the vehicle bumper or whether the small animal or other such object collides with the vehicle bumper.

In a second aspect of the present disclosure, side walls of the tube receiving groove are sloped downward toward the load receiving surface. An opening of the tube receiving groove is obliquely directed upward.

In a third aspect of the present disclosure, a side wall of the tube receiving groove is flush with the upper surface of the absorber body portion. An opening of the tube receiving groove is directed in a direction away from the load receiving surface. According to this aspect, when the collision load is horizontally applied to the vehicle bumper, due to the collision of the small animal or other such object against the vehicle bumper, the pressure tube received in the tube receiving groove may be prevented from being compressed. That is, the pressure tube may be compressed only when the pedestrian collides with the vehicle bumper.

In a fourth aspect of the present disclosure, the bumper absorber has a recessed portion formed in the load receiving surface thereof and extending in the vehicle width direction. The recessed portion is configured to function as a bend-promoting point when the elongated projecting portion is bent due to the collision load. According to this aspect, when the collision load is obliquely applied to the vehicle bumper from before and above, due to the collision of the pedestrian against the vehicle bumper, the elongated projecting portion may be easily bent backward. As a result, the pressure tube received in the tube receiving groove may be more easily compressed In a fifth aspect of the present disclosure, a pressing portion is disposed between the bumper cover and the load receiving surface of the bumper absorber at a position corresponding to the elongated projecting portion of the bumper absorber. According to this aspect, when the collision load is obliquely applied to the vehicle bumper from before and above, due to the collision of the pedestrian against the vehicle bumper, the collision load may be concentrated to the elongated projecting portion of the bumper absorber via the pressing portion, so that the elongated projecting portion may be easily bent backward. As a result, the pressure tube received in the tube receiving groove may be easily compressed.

In a sixth aspect of the present disclosure, the absorber body portion has an end surface that contacts the bumper reinforcement member when the collision load is applied thereto. A plurality of hole portions having a predetermined depth are formed in the end surface of the absorber body portion at a certain distance in the vehicle width direction. According to this aspect, when the collision load is horizontally applied to the vehicle bumper, due to the collision of the small animal or other such object against the vehicle bumper, a rear end portion of the absorber body portion of the bumper absorber may be initially compressed, so that the elongated projecting portion may be prevented from being bent backward. Therefore, when the small animal or other such object collides against the vehicle bumper, the pressure sensor received in the tube receiving groove may substantially be prevented from being compressed.

In a seventh aspect of the present disclosure, a plate-shaped projecting member extending in the vehicle width direction is formed in the load receiving surface of the absorber body portion. According to this aspect, when the collision load is horizontally applied to the vehicle bumper, due to the collision of the small animal or other such object against the vehicle bumper, the projecting member formed in a front surface of the absorber body portion of the bumper absorber may be initially compressed, so that the elongated projecting portion may be prevented from being bent. As a result, the pressure tube received in the tube receiving groove may substantially be prevented from being compressed.

DETAILED DESCRIPTION

Embodiment 1

In the following, a vehicle bumper according to an Embodiment 1 of the present disclosure will be described with reference to FIG. 1 to FIG. 16. The vehicle bumper according to this embodiment may be a front bumper 20 of a passenger vehicle 10 shown in FIG. 1.

Further, forward, backward, rightward, leftward, upward and downward directions described with reference to the figures may respectively correspond to forward, backward, rightward, leftward, upward and downward directions of the passenger vehicle 10 having the front bumper 20 according to the embodiment.

<Regarding Outline of Front Structure of Passenger Vehicle 10>

Figure 3:
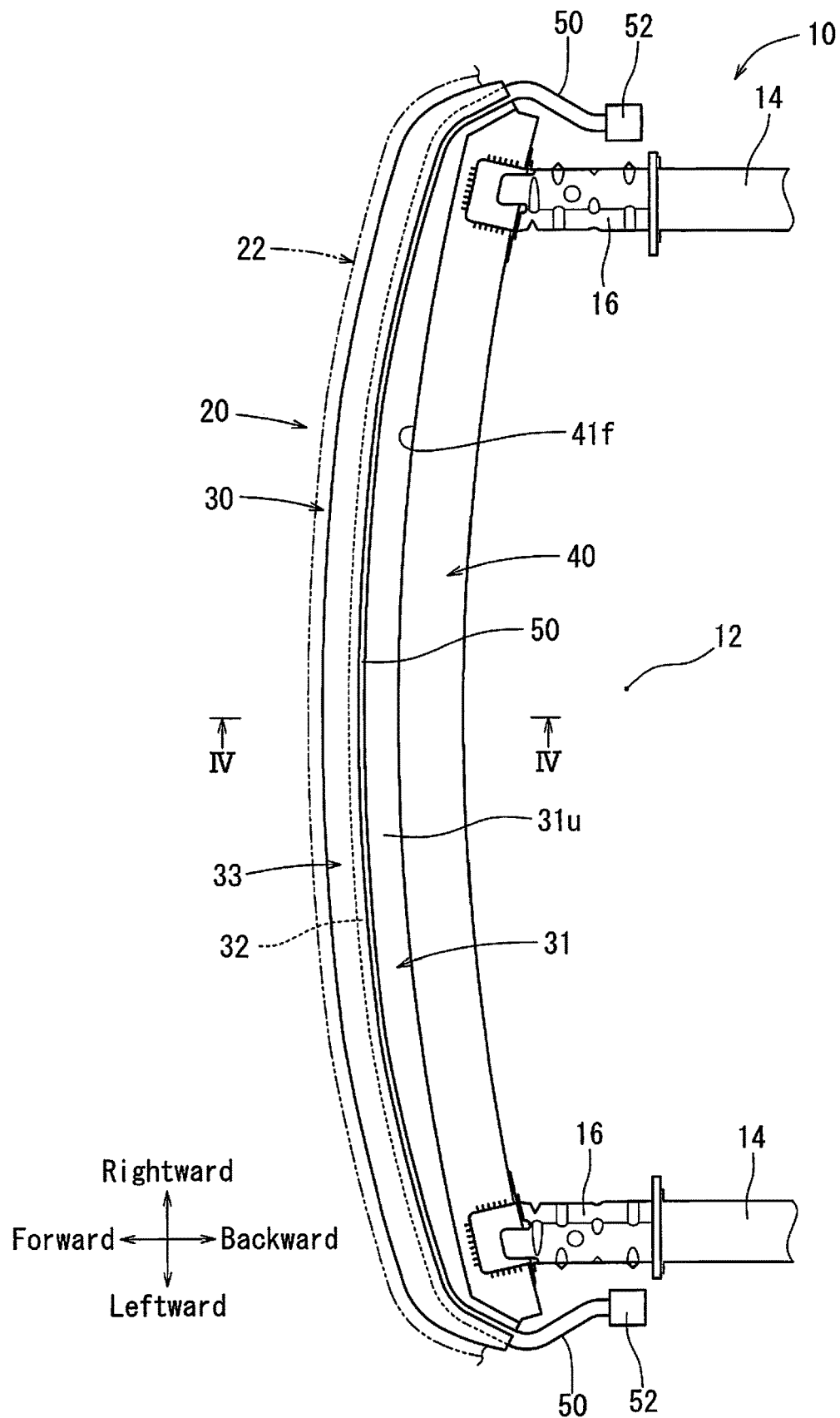
FIG. 3 is a plan view of a bumper absorber, a bumper reinforcement member and various other components of the vehicle bumper (viewed in a direction of arrow III of FIG. 2).

A front structure of the passenger vehicle 10 will be briefly described prior to providing a description of the front bumper 20. As shown in FIG. 3, the passenger vehicle 10 may have a pair of front side members 14 positioned on a front portion of a vehicle body and extending in a vehicle front-back direction. The front side members 14 may respectively be positioned on right and left sides of an engine compartment. The right and left front side members 14 may respectively have crushable boxes 16 that are respectively substantially axially attached to front end portions thereof. Further, the right and left crushable boxes 16 may respectively connected to right and left end portions of the front bumper 20. The crushable boxes 16 may be configured to be crushed between the front bumper 20 and the front side members 14 in the event of a frontal collision of the passenger vehicle 10, so as to absorb a collision load.

<Regarding Structure of Front Bumper 20>

Figure 2:
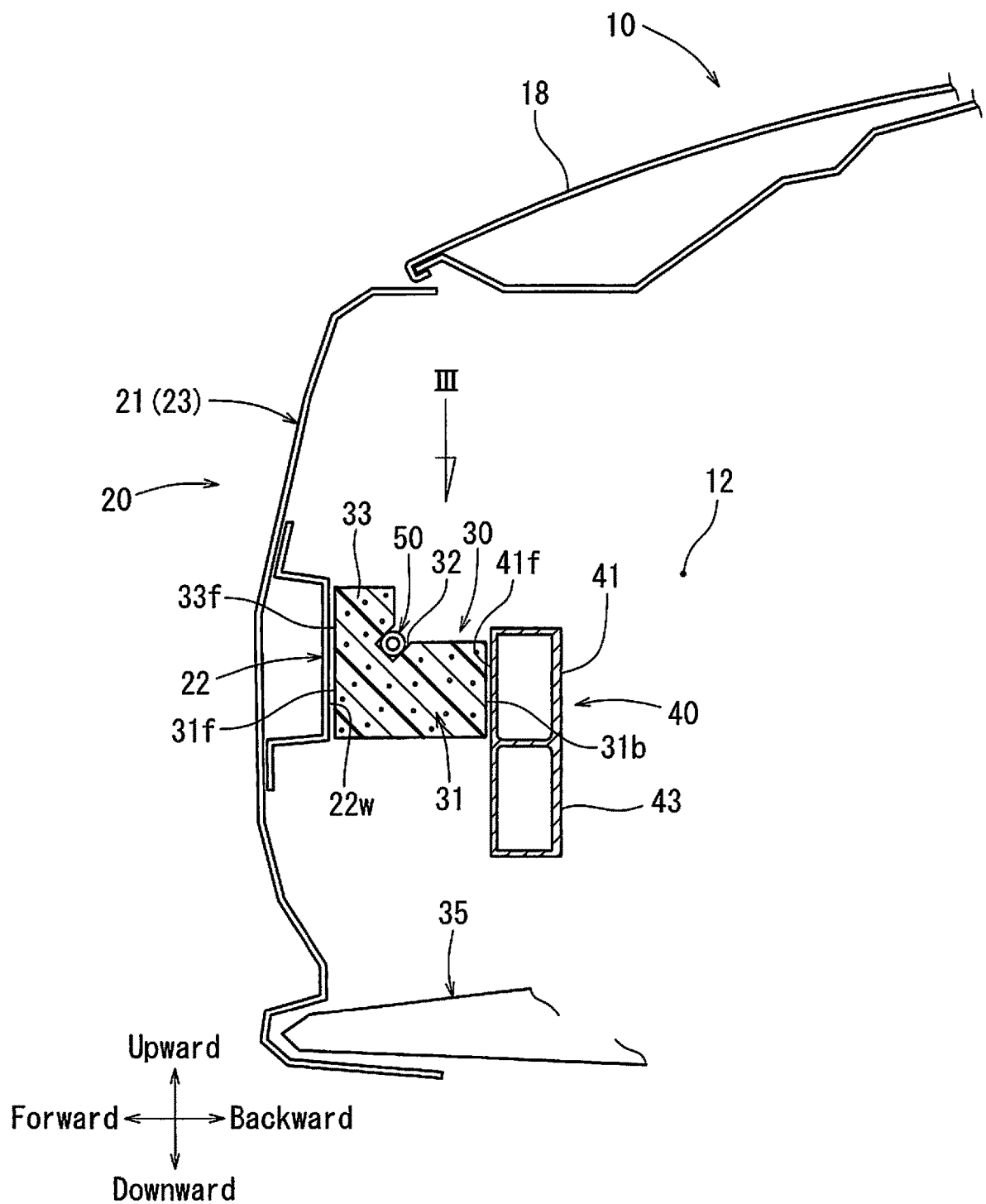
FIG. 2 is a schematic cross-sectional view of the vehicle bumper according to the embodiment.

As shown in FIG. 2, the front bumper 20 may include a bumper reinforcement member 40, a bumper absorber 30, a bumper cover 21 with a bumper grill 23, and a tube sensor 50 of a pedestrian-collision detection device (not shown). As shown in FIG. 3, the bumper reinforcement member 40 may be a beam-shaped member extending in a vehicle width direction. Right and left end portions of the bumper reinforcement member 40 may be connected to the right and left crushable boxes 16. The bumper reinforcement member 40 may be made of, for example, an aluminum alloy. Further, as shown in FIG. 2, the bumper reinforcement member 40 may have an upper rectangular cylindrical portion 41 and a lower rectangular cylindrical portion 43 that are vertically positioned.

Figure 4:
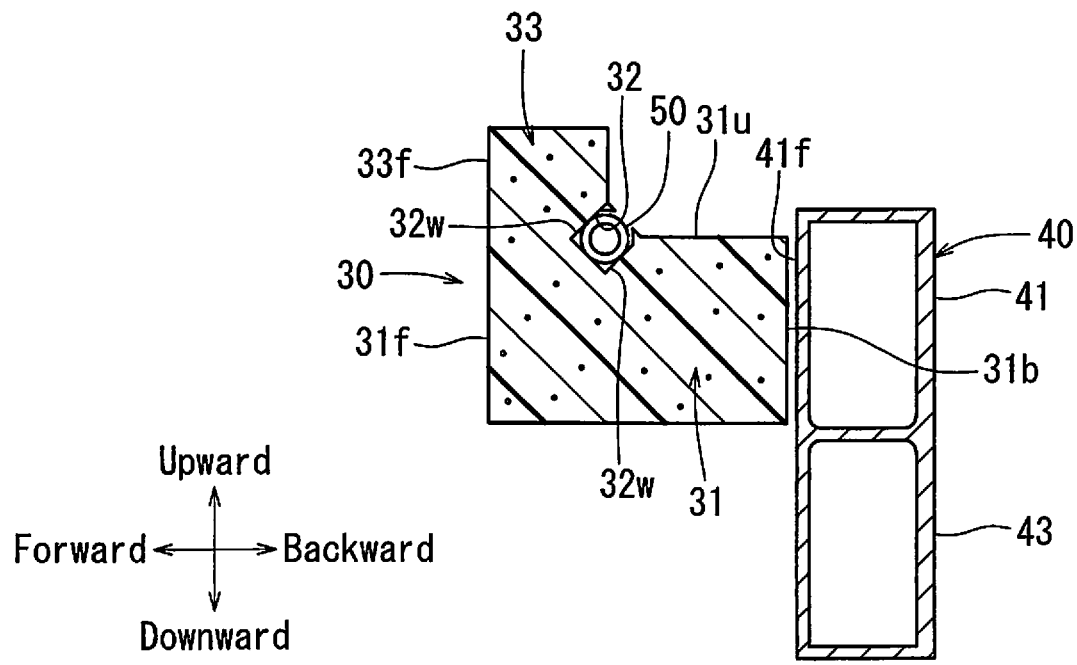
FIG. 4 is a cross-sectional view of the bumper absorber and the bumper reinforcement member (the cross-sectional view taken along line IV-IV of FIG. 3).

As shown in FIG. 2 and FIG. 3, the bumper absorber 30 may be attached to a front surface 41$f$ of the upper rectangular cylindrical portion 41 of the bumper reinforcement member 40. The bumper absorber 30 may be a cushioning member made of, for example, foamed polystyrene. As shown in FIG. 3 and FIG. 4, the bumper absorber 30 may be composed of a rectangular beam-shaped absorber body portion 31 extending in the vehicle width direction, and a rectangular elongated projecting portion 33 positioned on a front end periphery of an upper surface 31$u$ of the absorber body portion 31 and extending in the vehicle width direction, and may be formed into a substantially L-shape in cross section. Further, the absorber body portion 31 and the elongated projecting portion 33 may be configured such that front surfaces 31$f$ and 33$f$ thereof are flush with each other. Further, the front surface 31$f$ of the absorber body portion 31 and the front surface 33$f$ of the elongated projecting portion 33 may function as a load receiving surface by which the collision load F is received. Further, the absorber body portion 31 may be positioned such that a rear end surface 31$b$ thereof may cover the entire area of the front surface 41$f$ of the upper rectangular cylindrical portion 41 of the bumper reinforcement member 40 in the vehicle width direction.

A tube receiving groove 32, in which the tube sensor 50 is received, may be formed on the bumper absorber 30 at a boundary portion between the elongated projecting portion 33 and the upper surface 31$u$ of the absorber body portion 31. The tube receiving groove 32 may be configured to extend in the vehicle width direction. In particular, the tube receiving groove 32 may be formed in the upper surface 31$u$ of the absorber body portion 31 while penetrating into a rear end portion of the elongated projecting portion 33. The tube receiving groove 32 may be configured to extend in the vehicle width direction and be configured to open backward. As shown in FIG. 4, the tube receiving groove 32 may be a groove having a rectangular shape in cross section and having a width and a depth each of which is substantially equal to an outer diameter of the tube sensor 50. The tube receiving groove 32 may be formed such that a pair of side walls 32$w$ configured to diametrically sandwich the tube sensor 50 are sloped forward and downward. That is, the tube receiving groove 32 may be configured such that an opening thereof is obliquely directed backward and upward.

The tube sensor 50 may be an elastically deformable airtight tube. As shown in FIG. 3, one end (the left end) and the other end (the right end) of the tube sensor 50 may respectively communicate with pressure sensors 52. That is, the tube sensor 50 may be configured such that a pressure within the tube sensor 50 is detected by the right and left pressure sensors 52. Further, an intermediate portion of the tube sensor 50 positioned between the right and left pressure sensors 52 may be received in the tube receiving groove 32 of the bumper absorber 30. Further, the opening of the tube receiving groove 32 may be provided with holding strips (not labeled) in order to prevent the tube sensor 50 received in the tube receiving groove 32 from exiting the tube receiving groove 32. Output signals of the right and left pressure sensors 52 may be input into the pedestrian-collision detection device. Further, the tube sensor 50 may also be referred to as a pressure tube elsewhere in this disclosure.

Figure 1:
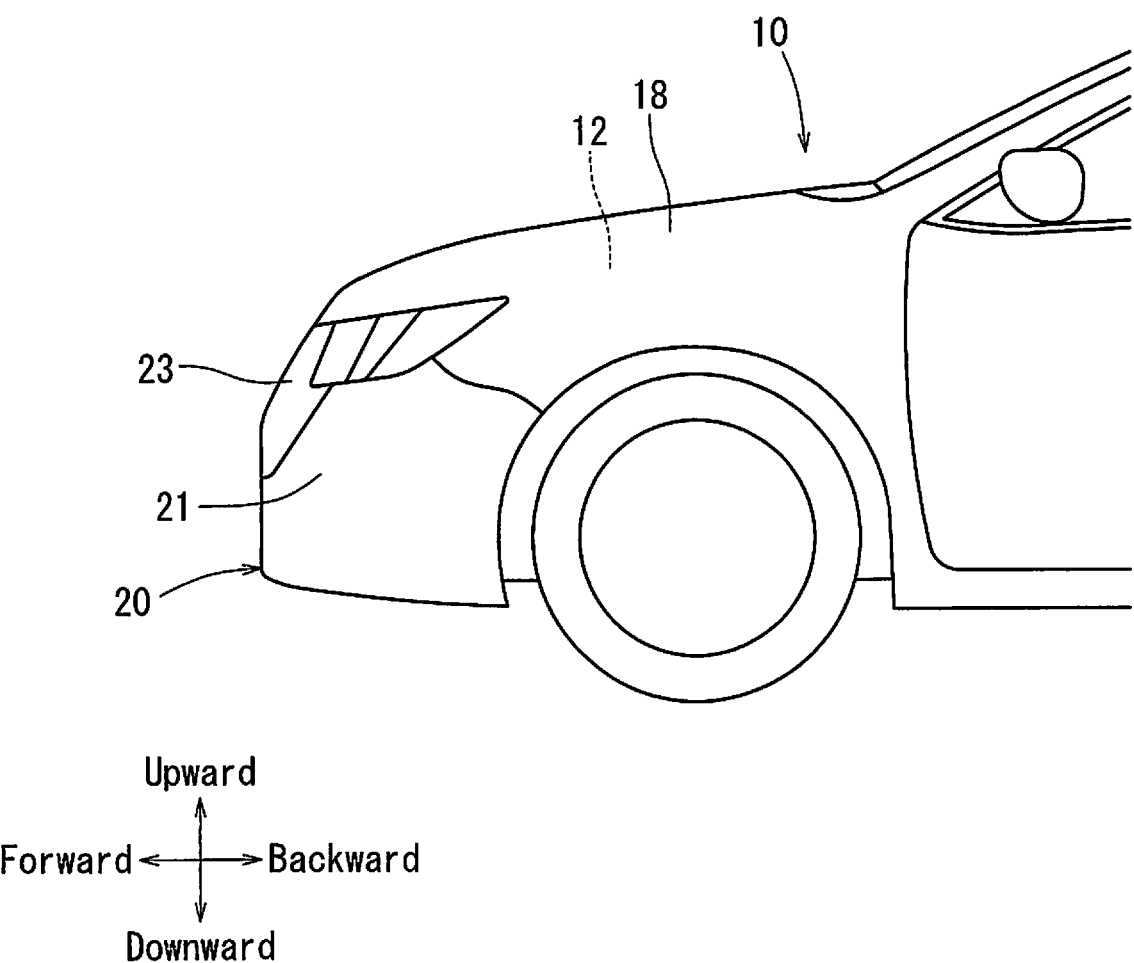
FIG. 1 is a side view of a vehicle having a vehicle bumper (front bumper) according to Embodiment 1 of the present disclosure.

As shown in FIG. 1, FIG. 2 and other figures, the bumper cover 21 may be a member defining a designing profile of the front bumper 20 and may be configured to cover the bumper absorber 30 and the bumper reinforcement member 40. Further, as shown in FIG. 2, an inner side of a lower end of the bumper cover 21 may be supported by a lower absorber 35. Further, the bumper cover 21 may be provided with an ornamental member of the bumper grill 23, which is positioned at a middle portion thereof. The bumper grill 23 may function as an air inlet. The bumper cover 21 with the bumper grill 23 may be referred to as a bumper cover in this disclosure.

As shown in FIG. 2, in the front bumper 20, the bumper cover 21 with the bumper grill 23 may have a spacer member 22 that is attached to an inner wall surface of the bumper cover 21 at the same height as the bumper absorber 30. The spacer member 22 may be configured to close a clearance between the bumper cover 21 and the bumper absorber 30 and a clearance between the bumper grill 23 and the bumper absorber 30. As shown in FIG. 2, the spacer member 22 may have a vertical wall surface 22$w$. The vertical wall surface 22$w$ may be configured so as to be capable of contacting the front surface 31$f$ of the absorber body portion 31 and the front surface 33$f$ of the elongated projecting portion 33 in the bumper absorber 30. Further, the vertical wall surface 22$w$ of the spacer member 22 may be configured such that a vertical dimension thereof is greater than a vertical dimension of the front surfaces 31$f$ and 33$f$ of the bumper absorber 30.

<Regarding Operation of Front Bumper 20>

Figure 5:
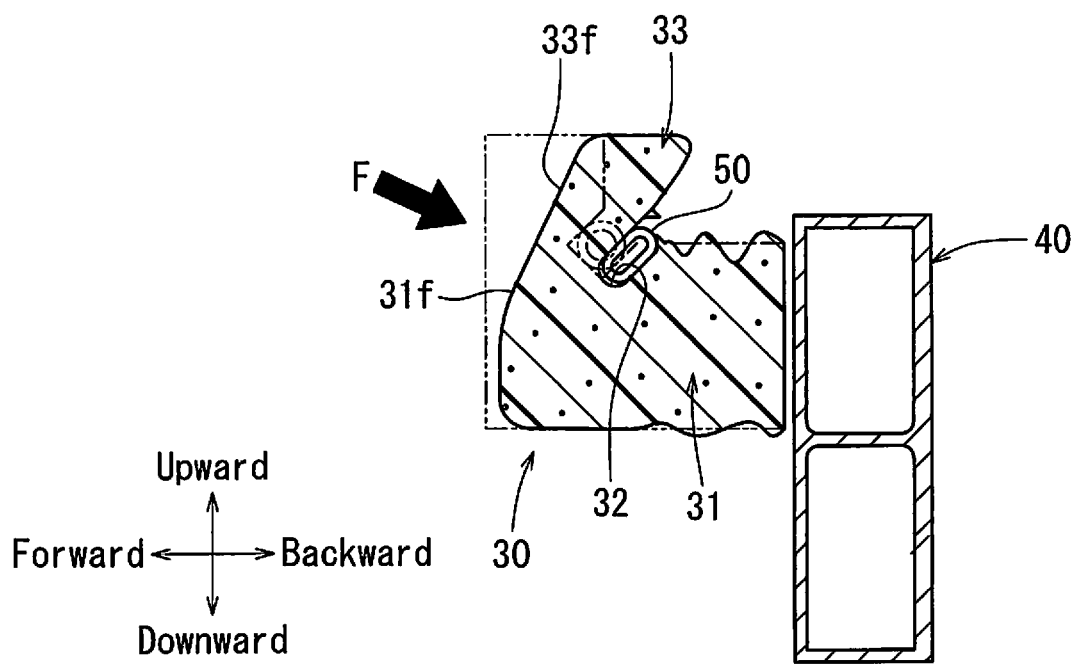
FIG. 5 is a schematic side view showing a deformation condition of the bumper absorber at the moment a pedestrian collides with the vehicle bumper.

Next, an operation of the front bumper 20 at the moment a pedestrian collides with the front bumper 20 will be described. When the pedestrian collides with the front bumper 20, the legs of the pedestrian may contact the front bumper 20 and the upper body of the pedestrian may fall against a hood 18. Therefore, the collision load F may be obliquely applied to the front bumper 20 from before and above. That is, as shown in FIG. 5, the collision load F may be obliquely applied to the front surfaces 31$f$ and 33$f$ (the load receiving surface) of the bumper absorber 30 from before and above via the bumper cover 21, the bumper grill 23 and the vertical wall surface 22$w$ of the spacer member 22. As a result, the elongated projecting portion 33 of the bumper absorber 30 may be compressed while being bent backward and downward about the tube receiving groove 32 serving as a base point, so that the tube sensor 50 received in the tube receiving groove 32 may be compressed.

Consequently, a pressure inside the tube sensor 50 may be increased. A pressure increase within the tube sensor 50 may be detected by the pressure sensor 52. The pedestrian-collision detection device may then activate, for example, a pop-up hood system, based on pressure signals from the pressure sensors 52. Thus, the hood 18 may be popped up, so that the pedestrian may be protected.

Figure 6:
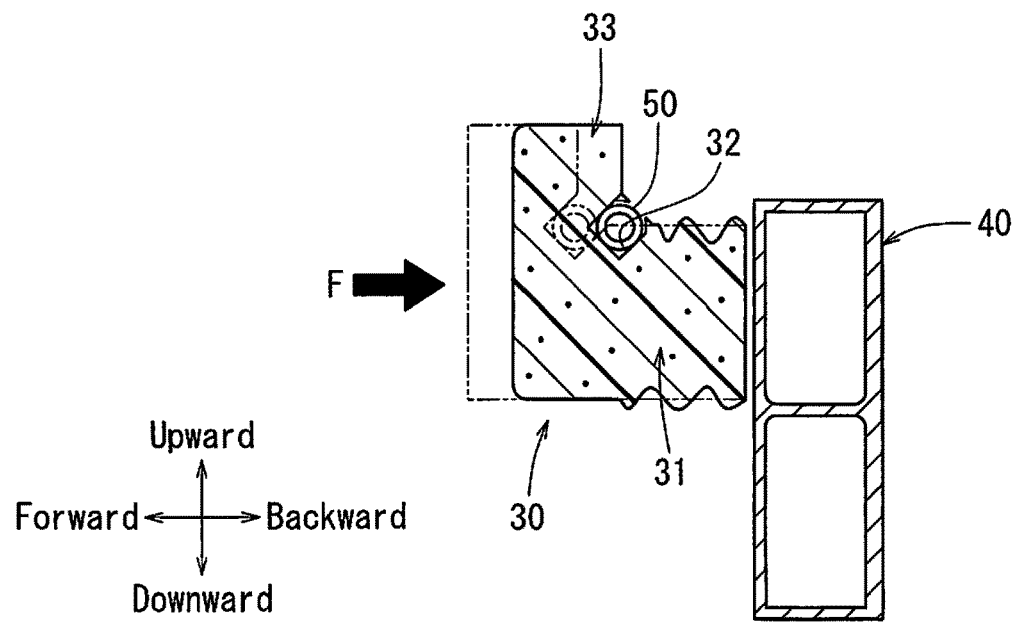
FIG. 6 is a schematic side view showing a deformation condition of the bumper absorber at the moment a small animal or other such object collides with the vehicle bumper.

Conversely, when a small animal or other such object collides with the vehicle bumper 100, the collision load F may be substantially horizontally applied to the front bumper 20. That is, as shown in FIG. 6, the collision load F may be horizontally applied to the front surfaces 31f and 33f of the bumper absorber 30 via the bumper cover 21, the bumper grill 23 and the vertical wall surface 22w of the spacer member 22. As a result, the absorber body portion 31 of the bumper absorber 30 may be horizontally compressed. At this time, the elongated projecting portion 33 may substantially be prevented from being deformed, so that the tube receiving groove 32 may be maintained in a condition in which it opens backward. Therefore, the tube sensor 50 may substantially be avoid being compressed, so that the pressure inside the tube sensor 50 may substantially be prevented from being increased. Thus, the pedestrian-collision detection device may be prevented from erroneously determining that a collision with the small animal or other such object is a collision with the pedestrian. Therefore, the pedestrian-collision detection device may be prevented from erroneously activating the pop-up hood system.

<Advantage of Front Bumper 20 of Present Embodiment>

According to the front bumper 20 of the present embodiment, the tube receiving groove 32, in which the tube sensor 50 (the pressure tube) is received, may be formed on the bumper absorber 30 at the boundary portion between the elongated projecting portion 33 and the upper surface 31u of the absorber body portion 31, while opening backward. Therefore, when the collision load F is obliquely applied to the front bumper 20 from in front and above due to a collision of the pedestrian against the front bumper 20, the elongated projecting portion 33 of the bumper absorber 30 may be compressed while being bent backward and downward about the tube receiving groove 32 serving as the base point, so that the tube sensor 50 received in the tube receiving groove 32 may be compressed. Conversely, when the collision load F is horizontally applied to the front bumper 20 due to a collision of the small animal or other such object against the front bumper 20, the absorber body portion 31 of the bumper absorber 30 may be horizontally compressed. At this time, the elongated projecting portion 33 may substantially avoid being deformed, so that the tube receiving groove 32 may be maintained in a condition in which it opens backward. Therefore, the tube sensor 50 may substantially avoid being compressed. Thus, when the pedestrian collides with the front bumper 20, the tube sensor 50 may be easily compressed, whereas when the small animal or other such object collides with the front bumper 20, the tube sensor 50 may avoid being easily compressed. This may lead to an increased degree of accuracy of determining whether the pedestrian collides with the front bumper 20 or whether the small animal or other such object collides with the front bumper 20.

Modified Embodiment 1

The embodiment described above can be changed or modified without departing from the scope of the disclosure.

Figure 7:
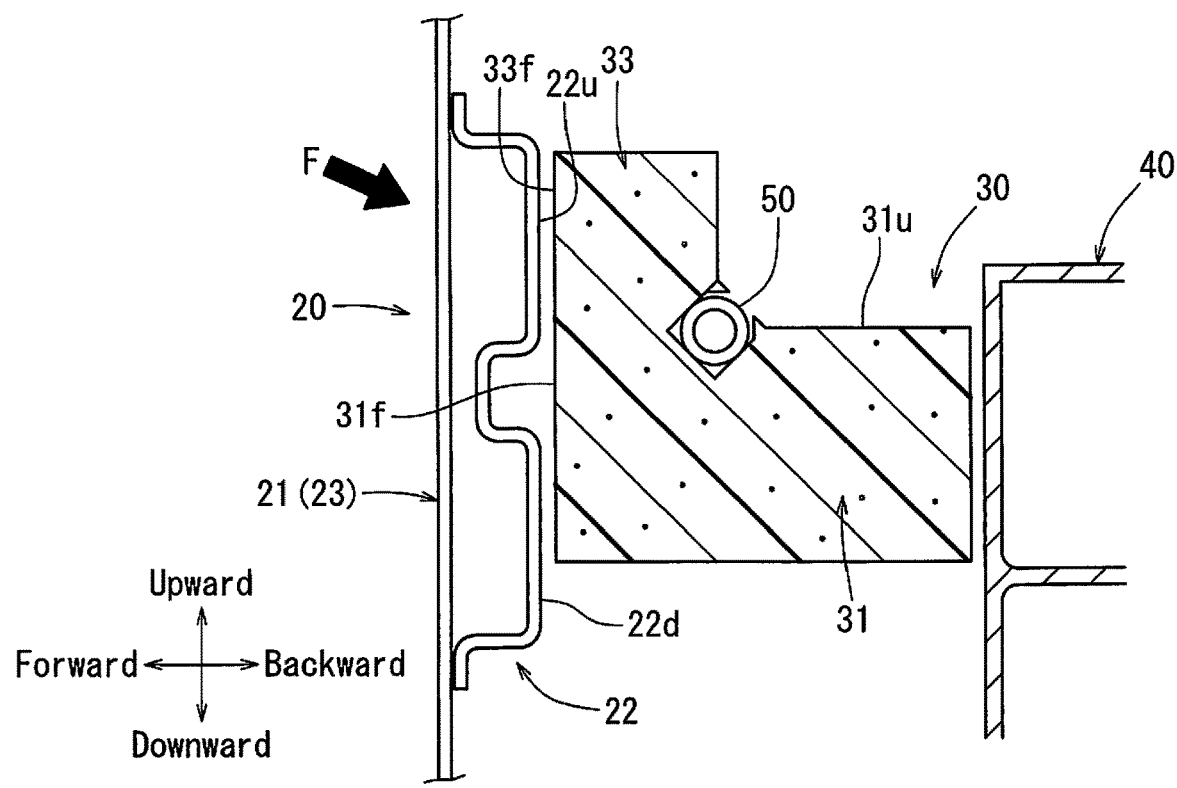
FIG. 7 is a cross-sectional view of a vehicle bumper according to Modified Embodiment 1.

For example, as shown in FIG. 2, in the embodiment, the vertical wall surface 22w of the spacer member 22 may be configured so as to contact the front surfaces 31f and 33f (the load receiving surface) of the bumper absorber 30 over the entire area thereof. However, as shown in FIG. 7, the spacer member 22 may have an upper projecting portion 22u and a lower projecting portion 22d positioned at a certain distance. The spacer member 22 thus modified may be positioned such that the upper projecting portion 22u corresponds to the elongated projecting portion 33 of the bumper absorber 30. Accordingly, when the collision load F is obliquely applied to the front bumper 20 from before and above due to the collision of the pedestrian against the front bumper 20, the collision load may be further concentrated to the elongated projecting portion 33 of the bumper absorber 30 via the upper projecting portion 22u of the spacer member 22. This may allow the elongated projecting portion 33 to more easily bend backward and downward. As a result, the tube sensor 50 received in the tube receiving groove 32 may be more easily compressed. Further, the upper projecting portion 22u of the spacer member 22 may be referred to as a pressing portion in this disclosure.

Modified Embodiment 2

Figure 8:
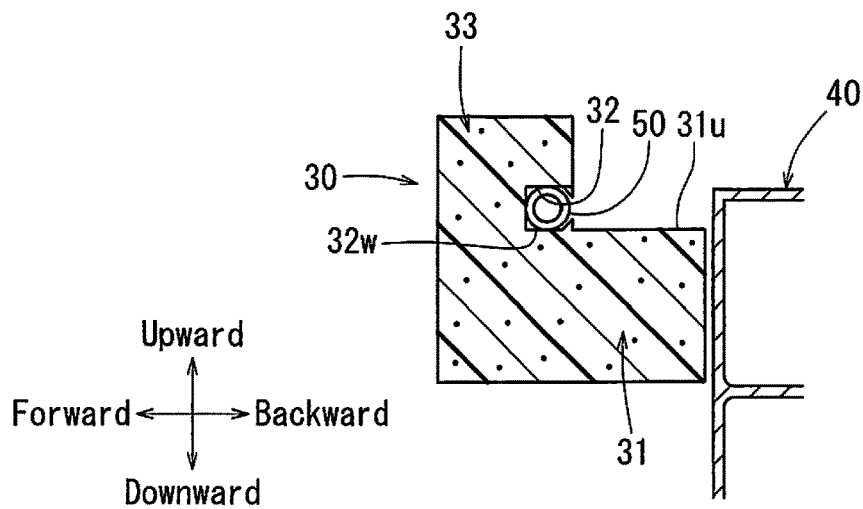
FIG. 8 is a cross-sectional view showing a bumper absorber of a vehicle bumper according to Modified Embodiment 2.

As shown in FIG. 4, FIG. 7 and other figures, in the embodiment, the tube receiving groove 32 of the tube sensor 50 may be formed to have the rectangular shape in cross section. Further, the tube receiving groove 32 may be configured such that the opening thereof is obliquely directed backward and upward. However, as shown in FIG. 8, the tube receiving groove 32 having the rectangular shape in cross section may be configured such that the lower side wall 32w is flush with the upper surface 31u of the absorber body portion 31. According to this modified embodiment, when the collision load F is horizontally applied to the front bumper 20, due to the collision of the small animal or other such object against the front bumper 20, the tube sensor 50 received in the tube receiving groove 32 may be further prevented from being compressed.

Modified Embodiment 3

Figure 9:
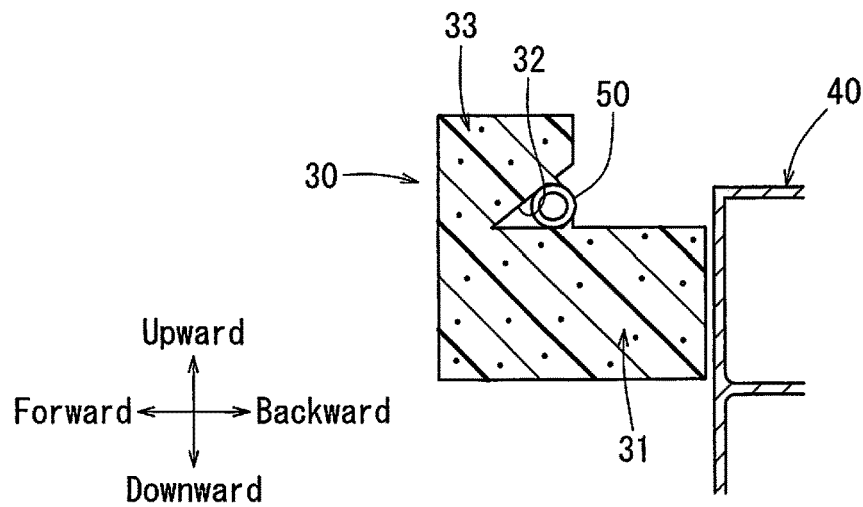
FIG. 9 is a cross-sectional view showing a bumper absorber of a vehicle bumper according to Modified Embodiment 3.
Figure 10:
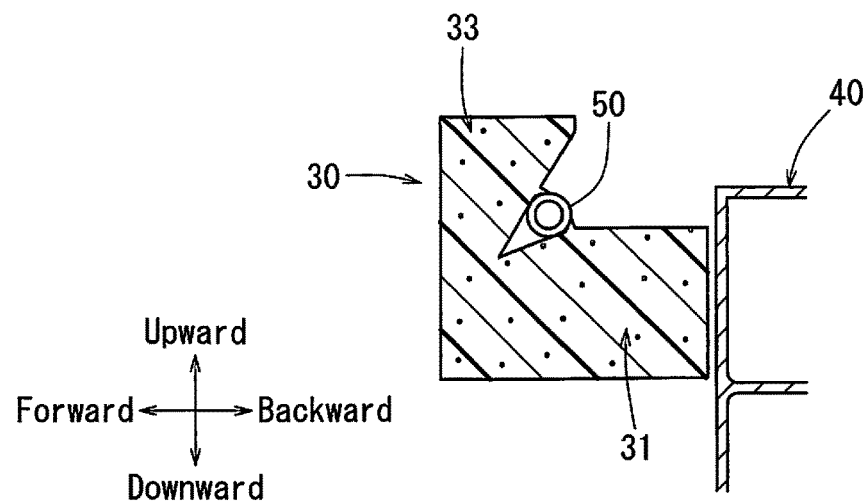
FIG. 10 is a cross-sectional view showing a bumper absorber of a vehicle bumper according to Modified Embodiment 3.

As shown in FIG. 9 and FIG. 10, the tube receiving groove 32 may have a triangular shape in cross section instead of the rectangular shape in cross section. According to this modified embodiment, when the collision load F is obliquely applied to the front bumper 20 from in front and above due to the collision of the pedestrian against the front bumper 20, the tube sensor 50 received in the tube receiving groove 32 may be more easily compressed.

Modified Embodiment 4

Further, in the embodiment, the tube receiving groove 32 may be configured such that each of the width and the depth thereof is substantially equal to the outer diameter of the tube sensor 50. However, as shown by the broken lines in FIG. 11, the depth of the tube receiving groove 32 may be further increased. According to the modified embodiment, when the collision load F is obliquely applied to the front bumper 20 from before and above, the elongated projecting portion 33 of the bumper absorber 30 may be easily bent backward and downward about the tube receiving groove 32 serving as the base point. As a result, the tube sensor 50 may be easily compressed.

Modified Embodiment 5

Figure 11:
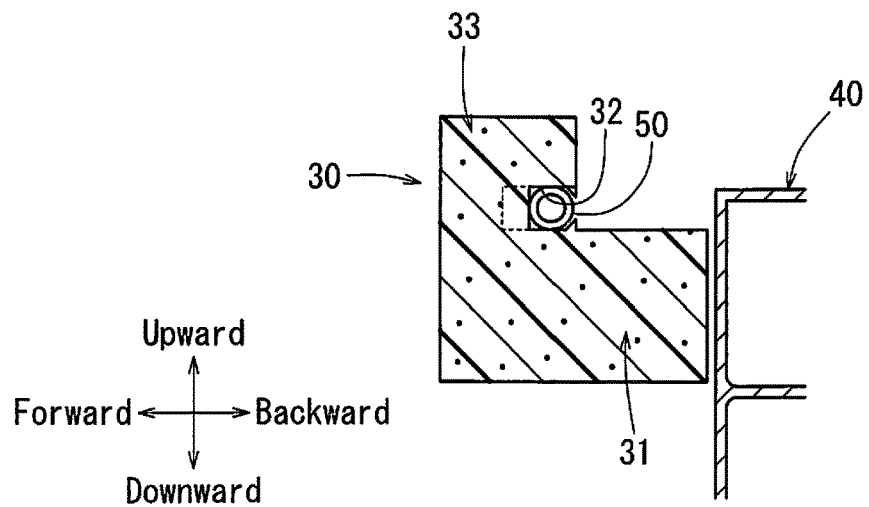
FIG. 11 is a cross-sectional view showing a bumper absorber of a vehicle bumper according to Modified Embodiment 4.
Figure 12:
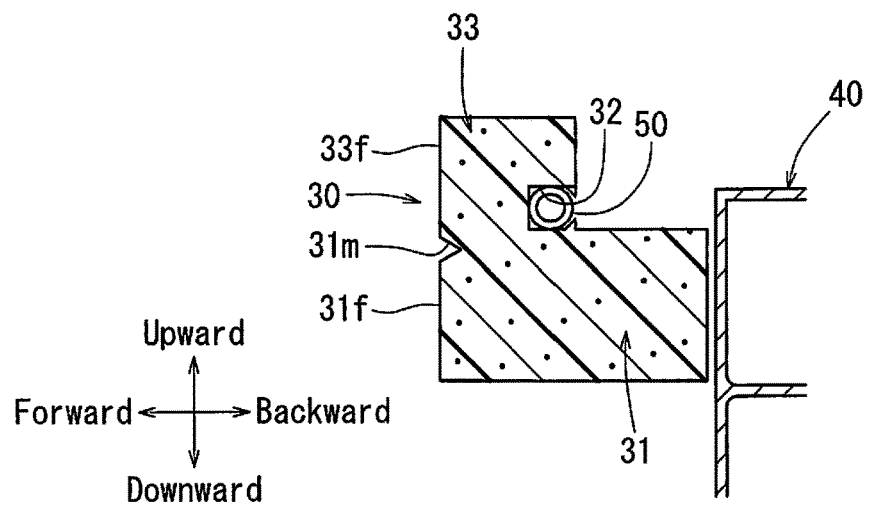
FIG. 12 is a cross-sectional view showing a bumper absorber of a vehicle bumper according to Modified Embodiment 5.

Further, as shown in FIG. 12, the bumper absorber 30 may be provided with a recessed portion 31m formed in the front surface 31f thereof instead of increasing the depth of the tube receiving groove 32 as shown in FIG. 11. The recessed portion 31m may extend in the vehicle width direction. The recessed portion 31m may function as a bend-promoting point when the elongated projecting portion 33 is bent backward and downward.

Modified Embodiment 6

Figure 13:
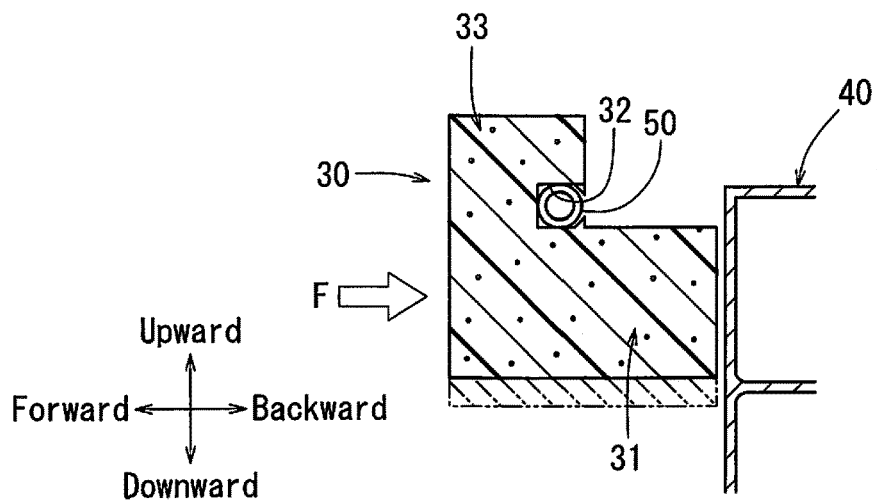
FIG. 13 is a cross-sectional view showing a bumper absorber of a vehicle bumper according to Modified Embodiment 6.
Figure 14:
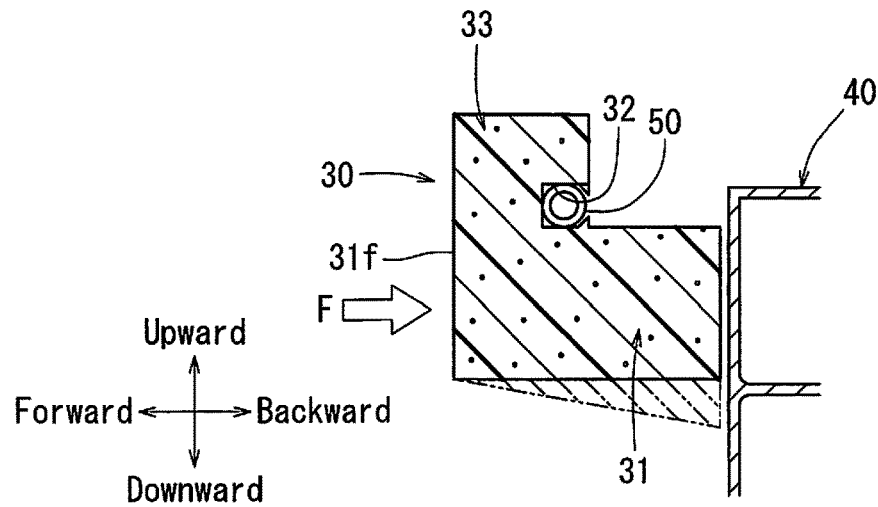
FIG. 14 is a cross-sectional view showing a bumper absorber of a vehicle bumper according to Modified Embodiment 6.

Further, as shown in FIG. 13, the absorber body portion 31 of the bumper absorber 30 may be uniformly increased in thickness relative to the elongated projecting portion 33 of the bumper absorber 30. According to this modified embodiment, when the collision load F is horizontally applied to the front bumper 20 due to the collision of the small animal or other such object against the front bumper 20, the bumper absorber 30 may be prevented from rotating upward or downward, so as to promote stable horizontal compression. According to this modified embodiment, the elongated projecting portion 33 may be prevented from being bent backward due to the collision load F being horizontally applied, so that the tube sensor 50 may be prevented from being compressed. Alternatively, as shown in FIG. 14, the absorber body portion 31 of the bumper absorber 30 may be gradually increased in thickness from front to back instead of uniformly increasing the absorber body portion 31 in thickness as shown in FIG. 13.

Modified Embodiment 7

Figure 15:
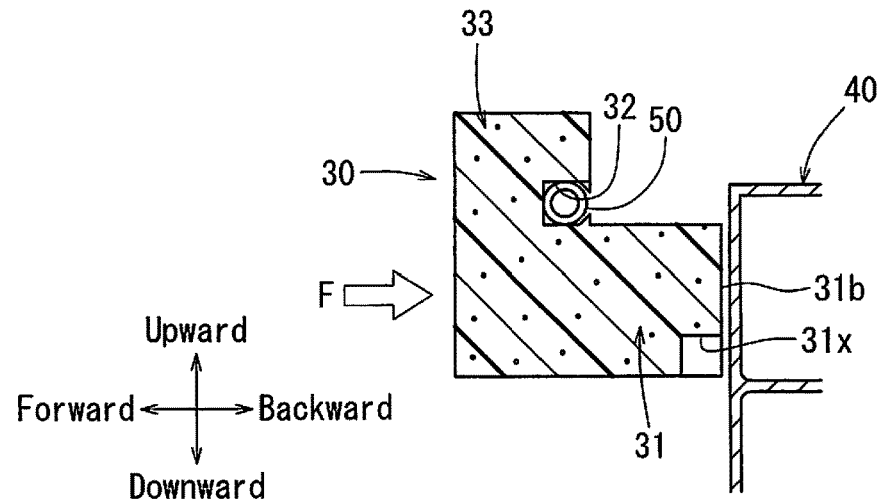
FIG. 15 is a cross-sectional view showing a bumper absorber of a vehicle bumper according to Modified Embodiment 7.

Further, as shown in FIG. 15, the bumper absorber 30 may be provided with a plurality of hole portions 31x, each having a predetermined depth. The hole portions 31x may be formed in the rear end surface 31b of the absorber body portion 31 at a certain distance in the vehicle width direction. According to this modified embodiment, when the collision load F is horizontally applied to the front bumper, a rear end portion of the absorber body portion 31 of the bumper absorber 30 may be compressed before other portions, so that the elongated projecting portion 33 may be prevented from being bent backward. Therefore, the tube receiving groove 32 formed on the bumper absorber 30 may substantially be prevented from being deformed, so that the tube sensor 50 may be prevented from being compressed.

Modified Embodiment 8

Figure 16:
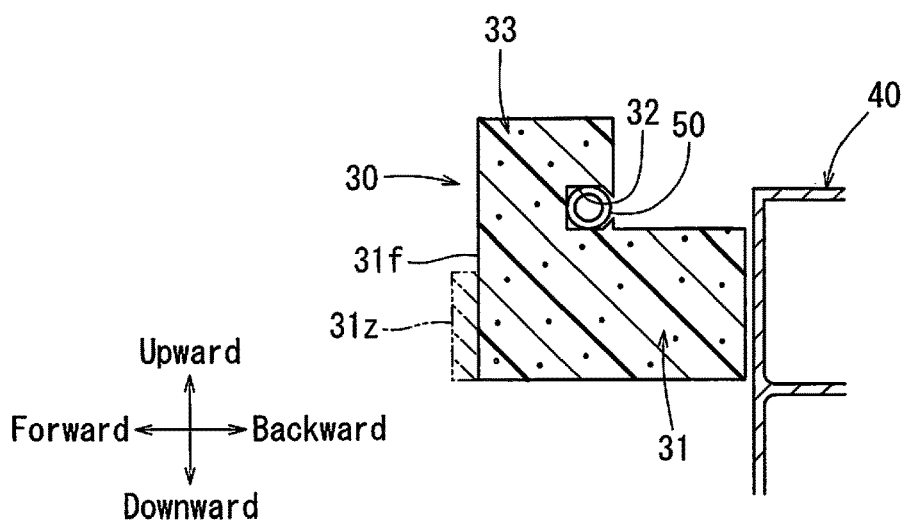
FIG. 16 is a cross-sectional view showing a bumper absorber of a vehicle bumper according to Modified Embodiment 8.
Figure 17:
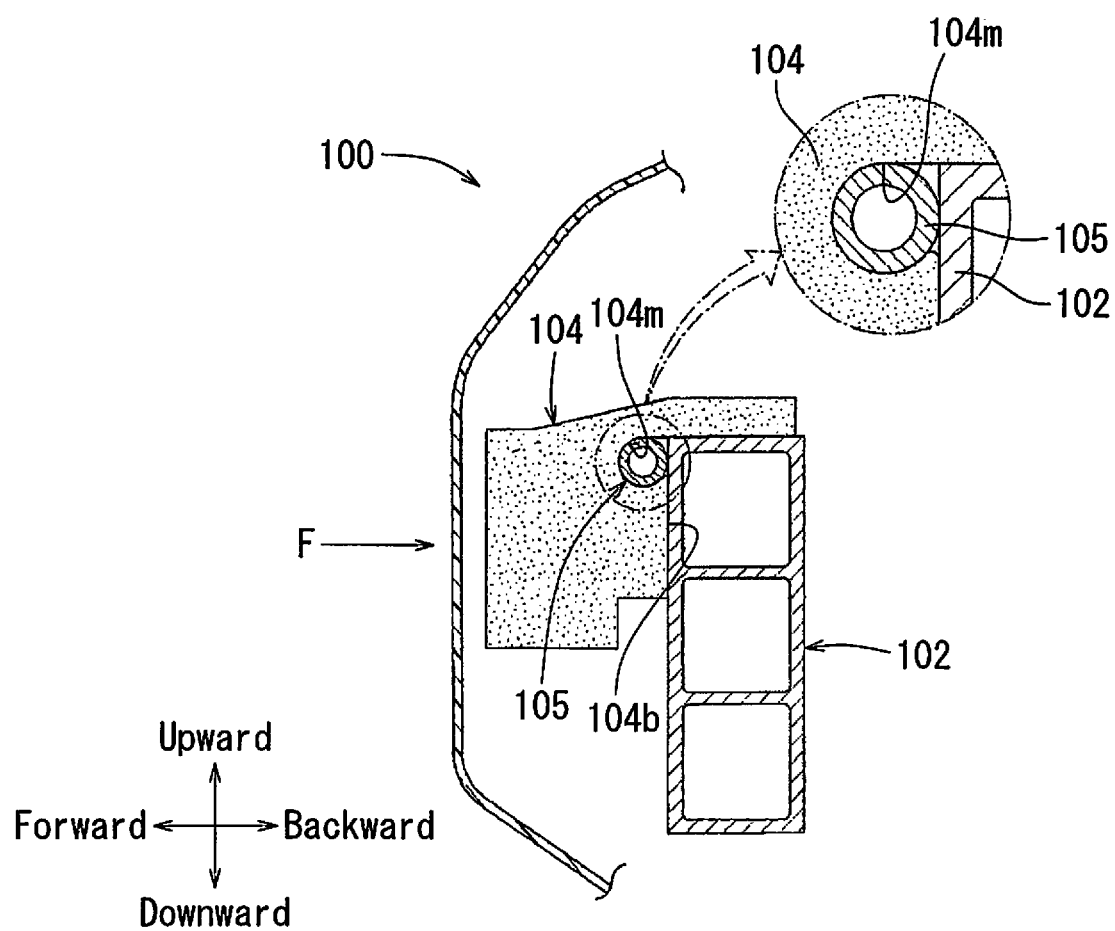
FIG. 17 is a cross-sectional view of a conventional vehicle bumper.

Further, as shown in FIG. 16, a plate-shaped projecting member 31z having a predetermined thickness may be formed in the front surface 31f of the absorber body portion 31 of the bumper absorber 30. The projecting member 31z may be configured to extend in the vehicle width direction. According to this modified embodiment, when the collision load F is horizontally applied to the front bumper, the projecting portion 31z formed in the front surface 31f of the absorber body portion 31 may be compressed before other portions, so that the elongated projecting portion 33 may be prevented from being bent backward. Therefore, the tube receiving groove 32 formed on the bumper absorber 30 may substantially be prevented from being deformed, so that the tube sensor 50 may be prevented from being compressed.

<Others>

Further, in the embodiment, the bumper absorber 30 is attached to the front surface 41f of the upper rectangular cylindrical portion 41 of the bumper reinforcement member 40. However, the bumper absorber 30 may be attached to a front surface of the lower rectangular cylindrical portion 43. Further, in the embodiment, the bumper reinforcement member 40 may be composed of the upper rectangular cylindrical portion 41 and the lower rectangular cylindrical portion 43 that are vertically positioned. However, a bumper reinforcement member composed of a single rectangular cylindrical portion may be used. Further, in the embodiment, the front bumper 20 of the vehicle is shown as an example. However, the disclosure may also be applied to a rear bumper of the vehicle.

The invention claimed is:

1. A vehicle bumper comprising a bumper reinforcement member connected to a vehicle body, a bumper absorber functioning as a cushioning member that covers the bumper reinforcement member and having a tube receiving groove that extends in a vehicle width direction, an elastically deformable pressure tube received in the tube receiving groove formed on the bumper absorber and in communication with a pressure sensor, and a bumper cover covering the bumper absorber and the bumper reinforcement member, wherein the bumper absorber includes a beam-shaped absorber body portion extending in the vehicle width direction, and an elongated projecting portion defining an upper portion of a load receiving surface of the absorber body portion and extending in the vehicle width direction at an end periphery of an upper surface of the absorber body portion, wherein the tube receiving groove is configured to extend in the vehicle width direction on the upper surface of the absorber body portion while penetrating into an end portion of the elongated projecting portion that is positioned opposite to the load receiving surface, and is configured to open in a direction away from the load receiving surface, wherein the tube receiving groove is formed in a position spaced away from the bumper reinforcement member, and wherein when a load is obliquely applied to the load receiving surface of the elongated projecting portion from above, the elongated projecting portion is compressed while being bent toward the bumper reinforcement member about the tube receiving groove serving as a base point.

2. The vehicle bumper as described in claim 1, wherein the bumper absorber is composed of the absorber body portion and the elongated projecting portion and is formed into a substantially L-shape in cross section, and wherein the tube receiving groove is positioned on a concave corner portion corresponding to a boundary portion between the elongated projecting portion and the upper surface of the absorber body portion and having an L-shaped cross section.

3. The vehicle bumper as described in claim 1, wherein side walls of the tube receiving groove are sloped downward toward the load receiving surface, and wherein an opening of the tube receiving groove is obliquely directed upward.

4. The vehicle bumper as described in claim 1, wherein a side wall of the tube receiving groove is flush with the upper surface of the absorber body portion, and wherein an opening of the tube receiving groove is directed in a direction away from the load receiving surface.

5. The vehicle bumper as described in claim 1, wherein the bumper absorber has a recessed portion formed in the load receiving surface thereof and extending in the vehicle width direction, and wherein the recessed portion is configured to function as a bend-promoting point when the elongated projecting portion is bent due to a collision load.

6. The vehicle bumper as described in claim 1, wherein a pressing portion is disposed between the bumper cover and the load receiving surface of the bumper absorber at a position corresponding to the elongated projecting portion of the bumper absorber.

7. The vehicle bumper as described in claim 1, wherein an end surface of the absorber body portion is configured to contact the bumper reinforcement member when the collision load is applied thereto, and is provided with a plurality of hole portions having a predetermined depth and positioned at a certain distance in the vehicle width direction.

8. The vehicle bumper as described in claim 1, wherein a plate-shaped projecting member extending in the vehicle width direction is formed in the load receiving surface of the absorber body portion.

9. A vehicle bumper, comprising:
   a bumper reinforcement member connected to a vehicle body;
   a bumper absorber covering the bumper reinforcement member, the bumper absorber having a load receiving surface configured to receive a load during a collision and having an end surface that is positioned opposite to the load receiving surface and faces the bumper reinforcement member; and
   a tube receiving groove formed in the bumper absorber and configured to receive a pressure tube,
   wherein the bumper absorber is composed of an absorber body portion extending in a vehicle width direction and a projected portion formed on the absorber body portion and extending in the vehicle width direction portion, so as to have a concave corner portion formed thereon and positioned between the load receiving surface and the end surface thereof,
   wherein the load receiving surface of the bumper absorber is defined by a first surface of the absorber body portion and a first surface of the projected portion while the end surface of the bumper absorber is defined by a second surface of the absorber body portion positioned opposite to the first surface of the absorber body portion, and
   wherein the tube receiving groove extends along the concave corner portion of the bumper absorber.

10. The vehicle bumper as described in claim 9, wherein the tube receiving groove is configured to open in a direction away from the load receiving surface.

11. The vehicle bumper as described in claim 10, wherein the tube receiving groove is configured to obliquely open.

12. The vehicle bumper as described in claim 10, wherein the tube receiving groove is configured to horizontally open.

* * * * *